(12) United States Patent
Parivar et al.

(10) Patent No.: US 9,448,809 B2
(45) Date of Patent: Sep. 20, 2016

(54) PERIPHERAL DEVICE MAPPING

(75) Inventors: Nima Parivar, South San Francisco, CA (US); Jesse Michael Devine, Campbell, CA (US); Christopher T. Mullens, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/312,556

(22) Filed: Dec. 6, 2011

(65) Prior Publication Data

US 2013/0145061 A1 Jun. 6, 2013

(51) Int. Cl.
*G06F 13/12* (2006.01)
*G06F 9/44* (2006.01)
*G06F 3/023* (2006.01)

(52) U.S. Cl.
CPC ........... *G06F 9/4415* (2013.01); *G06F 3/0238* (2013.01); *G06F 9/4448* (2013.01)

(58) Field of Classification Search
CPC ... G06F 9/4415; G06F 9/4448; G06F 3/0238
USPC ........................................................ 710/67
See application file for complete search history.

(56) References Cited

U.S. PATENT DOCUMENTS

| | | | |
|---|---|---|---|
| 4,392,037 A | 7/1983 | Fleming | |
| 5,463,742 A | 10/1995 | Kobayashi | |
| 5,631,643 A * | 5/1997 | Hisamori et al. | 341/23 |
| 5,929,405 A | 7/1999 | Wehrli, III et al. | |
| 5,941,373 A | 8/1999 | Cheng | |
| 6,057,522 A | 5/2000 | Chao | |
| 6,418,534 B1 | 7/2002 | Fogle | |
| 6,437,269 B1 | 8/2002 | Rakus | |
| 6,574,517 B1 | 6/2003 | Park et al. | |
| 6,615,287 B1 * | 9/2003 | Behrens et al. | 710/8 |
| 7,038,665 B1 | 5/2006 | Pandana | |
| 7,209,124 B2 | 4/2007 | Hunt et al. | |
| 7,289,813 B2 | 10/2007 | Karaoguz | |
| 7,316,648 B2 | 1/2008 | Kelly et al. | |
| 7,865,640 B1 | 1/2011 | Lewis et al. | |
| 7,873,764 B2 | 1/2011 | Bica | |

(Continued)

FOREIGN PATENT DOCUMENTS

| | | |
|---|---|---|
| CN | 1286419 | 3/2001 |
| CN | 101382904 | 2/2006 |
| KR | 10-2001-0025777 | 4/2001 |

OTHER PUBLICATIONS

Mike Hanlon, "Optimus Keyboard by Art.Lebedev". Jun. 15, 2005, Gizmag, http://www.gizmag.com/go/4283 (retrieved Apr. 7, 2011).*

(Continued)

*Primary Examiner* — Henry Tsai
*Assistant Examiner* — John Roche
(74) *Attorney, Agent, or Firm* — Brownstein Hyatt Farber Schreck, LLP

(57) ABSTRACT

Systems and methods related to providing peripheral device functionality is described herein. In one embodiment, a method of operating a host computing device is described. The method includes communicatively coupling with a keyboard and querying the keyboard for a descriptor. Receiving the descriptor from the keyboard, wherein the descriptor includes data representative of a language, layout, and key mappings for the keyboard. Storing the data from the descriptor at the host and publishing strings for proper translation and interpretation of input received from the keyboard.

25 Claims, 5 Drawing Sheets

(56) References Cited

U.S. PATENT DOCUMENTS

| | | |
|---|---|---|
| 7,987,421 B1 * | 7/2011 | Timothy et al. ............. 715/243 |
| 2003/0097555 A1 * | 5/2003 | Cheston et al. .................. 713/2 |
| 2004/0064199 A1 | 4/2004 | Asoh et al. |
| 2004/0104941 A1 * | 6/2004 | Natoli .......................... 345/772 |
| 2007/0063860 A1 * | 3/2007 | Escobosa et al. ....... 340/825.22 |
| 2008/0132243 A1 | 6/2008 | Spalink et al. |
| 2008/0165035 A1 * | 7/2008 | Bhella et al. ................... 341/23 |
| 2009/0011707 A1 | 1/2009 | Ko et al. |
| 2009/0175561 A1 | 7/2009 | Lankswert |
| 2009/0186575 A1 | 7/2009 | Perpinya et al. |
| 2009/0187677 A1 | 7/2009 | Hunt et al. |
| 2010/0082843 A1 * | 4/2010 | Lu et al. ......................... 710/10 |
| 2010/0185785 A1 | 7/2010 | Wu et al. |
| 2010/0281410 A1 * | 11/2010 | Heintze ........................ 715/769 |
| 2010/0286983 A1 * | 11/2010 | Cho .............................. 704/246 |
| 2011/0162035 A1 | 6/2011 | King et al. |
| 2011/0162048 A1 | 6/2011 | Bilbrey et al. |
| 2013/0062174 A1 | 3/2013 | Kiple et al. |

OTHER PUBLICATIONS

Nathan Kirsch, "Future Look: The Optimus Organic LED Keyboard". Sep. 19, 2005, Legit Reviews, http://www.legitreviews.com/article.php?aid=247 (retrieved Apr. 7, 2011).*

Author Unknown, "iGPS—Large Scale Metrology," http://www.mikonmetrology.com/_template.php?id=47&lang+&print=1, 1 page, at least as early as Dec. 31, 2009.

Stettner et al., "Three Dimensional Flash Ladar Focal Planes and Time Dependent Imaging," Advanced Scientific Concepts, Inc., 5 pages, at least as early as Dec. 31, 2009.

International Search Report and Written Opinion, PCT Application No. PCT/US2012/056688, 16 pages, Dec. 10, 2012.

Universal Serial Bus (USB), Devices Class Definition for Human Interface Devices (HIP) Firmwave Specification, USB Implementers Forum, Jun. 27, 2001, Version 1.1, XP0030133256, 96 pages.

Korean Office Action dated Sep. 25, 2015, Application No. KR 10-2014-7014565, 9 pages.

Australian Office Action dated May 21, 2015, Application No. 2012348305, 4 pages.

Chinese Office Action dated Apr. 5, 2016, Application No. 201280052165.2, 22 pages.

European Search Report dated Apr. 21, 2016, EP 12770382.5, 7 pages.

* cited by examiner

PERIPHERAL DEVICE MAPPING

TECHNICAL FIELD

The present application generally relates to systems and methods for determining configurations and capabilities of a peripheral device and, more particularly, relates to a method for determining a keyboard's language, key mapping, and functionality.

BACKGROUND

A wide variety of peripheral devices are available for today's computing systems that allow a user to input information. A non-exhaustive list of input devices includes: keyboards, mice, track pads, touch screens, styluses, keypads, and the like. Generally, when an input device is coupled to a host computing device, a product identifier (ID) for the input device may be provided to the host to allow the host to recognize the device and its functionality. The host device may store one or more tables that correlate the product ID with input functionality, language and key mappings.

Some input devices overload certain buttons so that they may perform multiple functions. That is, certain buttons may be assigned multiple functions that may be enabled in a particular operating environment or in combination with other keys. Common examples include the F-keys and arrow keys of a keyboard, which may be used to perform functions such as display brightness adjustment, volume adjustment, media control and status monitoring in addition to other functions. Holding down an alternate behavior key such as an Fn key allows the user to toggle between 'F-Key mode', and the alternate functionality of each key. By overloading existing keys, additional functionality can be added without adding more keys to the keyboard.

The mapping of the additional functionality or alternate behavior currently occurs at the host. That is, the host stores a table that identifies, on a per-device basis, the alternate behavior of each button or input device. When peripherals are updated, for example to add a new key (or add functionality to a key), the tables must be updated. The updating of the tables of each host becomes challenging over time, and requires the host software to know about every peripheral configuration that exists. This may be particularly difficult with respect to keyboards, as each keyboard may have multiple unique product IDs. For example, in some cases, at least two or three unique product IDs are used to identify a layout, a language and a mapping for the keyboard, all of which must be updated along with the tables utilized by host software any time the layout or key functionality changes. Every keyboard with a different mapping needs to be uniquely identifiable so that host software may differentiate it. Additionally, further differentiation is needed for the different keyboard layouts (e.g., International Organisation for Standards (ISO) layout, American National Standards Institute (ANSI) layout, or Japanese Standards Association (JIS) layout) and languages (English, German, Spanish, and so forth). While the Universal Serial Bus (USB) Human Interface Device (HID) Specification may provide a protocol for keyboards to report their language, typically a user must select a language for the keyboard.

SUMMARY

Systems and methods related to providing peripheral device functionality are described herein. In one embodiment, a method of operating a host computing device is described. The method includes communicatively coupling with a keyboard and querying the keyboard for a descriptor. Receiving the descriptor from the keyboard, wherein the descriptor includes data representative of a language, layout, and key mappings for the keyboard. Storing the data from the descriptor at the host and publishing strings for proper translation and interpretation of input received from the keyboard.

Another embodiment may take the form of a computing system that includes a keyboard having a memory storing language, layout and keyboard mapping information for the keyboard and at least one key that is assigned multiple functions. The computing system also includes a host device in communication with the keyboard and configured to query the keyboard for language, layout, and keyboard mapping from the keyboard.

The host device includes a memory configured to receive and store the language, layout and keyboard mapping of the keyboard and a processor configured to execute operations in response to input received from the keyboard in accordance with the language, layout and keyboard mapping stored in the memory. Further, the processor is configured to determine if the multiple functions of the at least one key are to be executed when the host receives input from the keyboard indicating selection of one of the multiple functions of the key.

Yet another embodiment may take the form of a method of interoperation in a system having a host and a peripheral. The method includes initiating communication between the host device and the peripheral and requesting a descriptor from the peripheral. Further, the method includes the host receiving the descriptor, wherein the descriptor comprises data indicating at least one of a language, a layout and a mapping of the peripheral. The mapping of the peripheral indicates specific functionality of at least one input device of the peripheral. Additionally, the method includes determining if an input device is assigned alternate behaviors based on the data received in the descriptor and deciding if the alternate behaviors are to be executed by the host device if the input device is assigned alternate behaviors. If the host decided to execute the alternate behaviors, the method also includes executing the alternate behaviors upon receiving input from the peripheral indicating alternate behavior. In addition, the method includes ignoring input from the peripheral indicating alternate behavior if the host device decided not to execute the alternate behaviors.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

A system and method for peripheral devices to report their functions, mappings, layout, language and so forth are provided. The system includes a host in communication with a peripheral device. In one embodiment, the peripheral device may take the form of a keyboard. Host software may query the keyboard for a descriptor that may include a layout for the keyboard, a language for the keyboard and a mapping for the keyboard. For example, the descriptor may contain a mapping of the function keys and arrow keys to alternate or non-standard functions. The descriptor may also describe a key as having no alternate behavior, or being disabled in its alternate role. Generally, as used herein, "descriptor" may to refer to identifying information or data that is stored on a peripheral device and used to identify the device as having a particular layout, language, keys, mappings and functionality, for example. In some embodiments, the descriptor may be defined to include a set number of bytes with each byte corresponding to and/or describing a particular aspect of the peripheral device for which it is used to identify.

Upon querying this report and receiving the descriptor from the peripheral in return, the host software determines which of the alternate capabilities it recognizes or otherwise supports. That is, the host software interrogates the keyboard language and mapping, and behaves in a manner it deems appropriate. If a keyboard mapping is unsupported, host software may choose to ignore the key, display an error message, or allow the key to function in its unmapped capacity, among other things. Alternatively, if the host software supports the functionality it may similarly provide a notice to the user. The host software stores and utilizes the data from the descriptor to define the layout, language and mappings of the input received from the peripheral device. By allowing the keyboard to describe its own language, layout, and alternate mappings, the need for the host to be able to differentiate between various keyboard revisions, languages, mappings and layouts through the use of tables and product IDs is eliminated.

Figure 1:
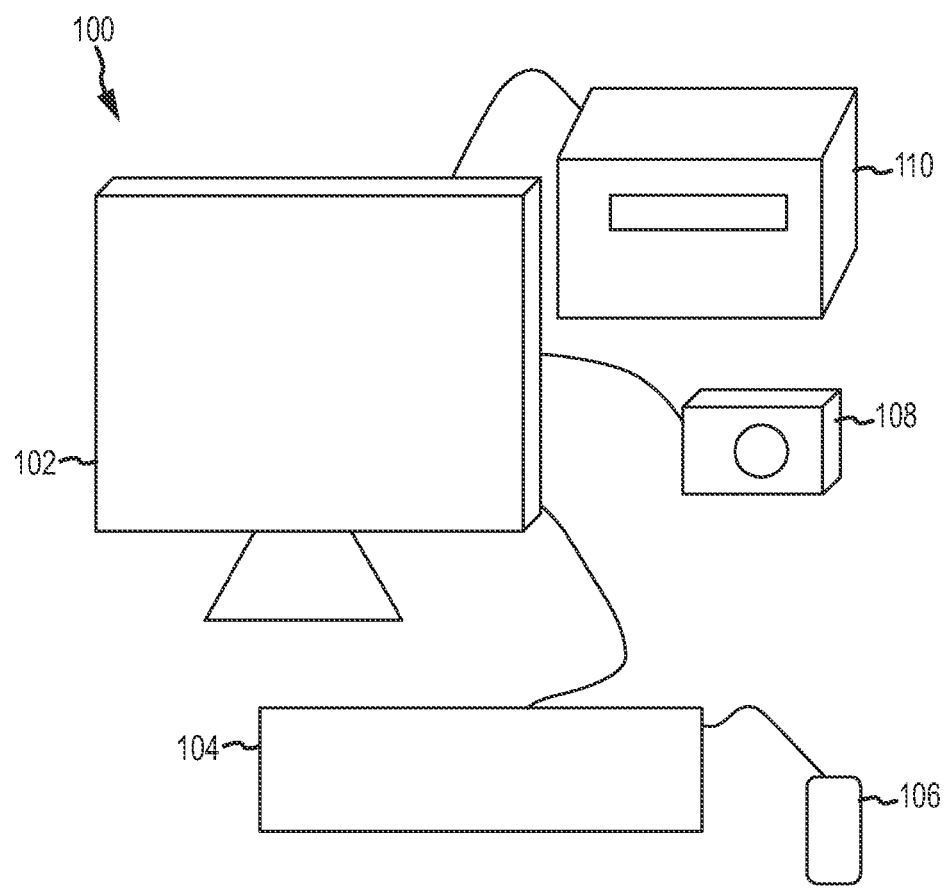
FIG. 1 illustrates a computing system that includes a host having a number of peripheral devices coupled thereto.

Turning to the drawings and referring initially to FIG. 1, a computing system 100 is illustrated and includes a host 102 with a variety of peripheral devices coupled thereto. The peripheral devices include a keyboard 104, a mouse 106, a camera 108, and a printer 110. The peripheral devices may communicate with the host 102 via any suitable communication protocol including, but not limited to, a wireless standard such as WiFi, Bluetooth, infrared, and the like or a wired standard such as USB, Firewire, and the like. It should be appreciated that the illustrated peripheral devices are provided merely as examples and are not to be understood as being exhaustive or exclusive of other peripheral devices with which the present techniques may be implemented. Indeed, any host and peripheral coupling may implement the techniques discussed herein.

Generally, for the host 102 and peripheral devices to interoperate properly, data is transferred therebetween to allow the host to identify the peripheral devices and to know or learn of their capabilities. Thus, either upon start up of the system 100 or upon connection of a peripheral device with the host 102, the host queries the peripheral device to obtain a descriptor that includes identifying data. The descriptor may indicate a language for the device, a layout for the device and mappings for the device. Hence, the descriptor provides the host with information to allow the host 102 and peripheral to communicate (e.g., so that the host may properly understand and receive input from the devices).

Figure 2:
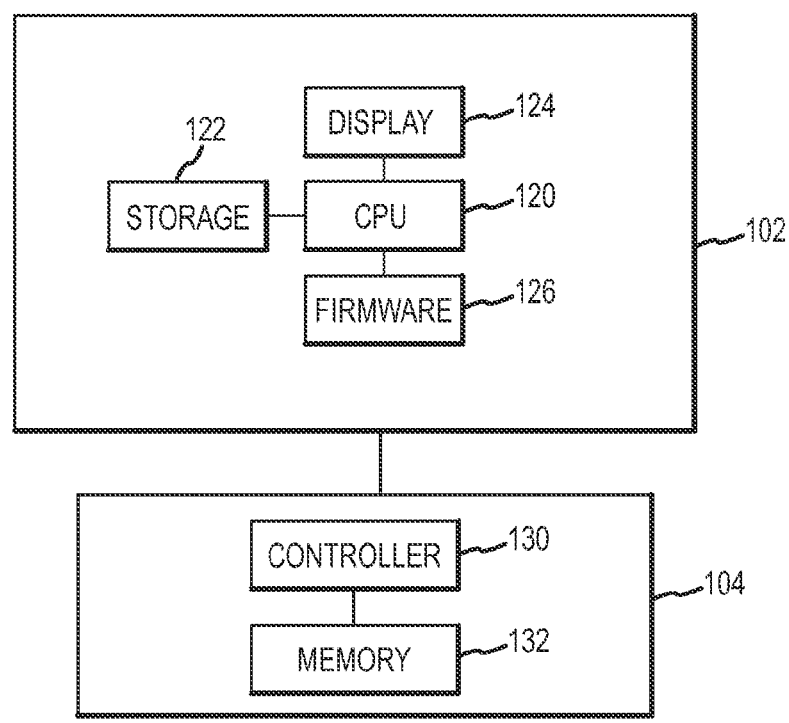
FIG. 2 is a block diagram illustration of the host of FIG. 1 coupled to a keyboard.

While multiple peripheral devices have been mentioned, in the interest of brevity, only the specific example of the keyboard 104 coupling with the host 102 will be described in greater detail below. In FIG. 2, a block diagram of the host 102 and keyboard 104 is shown. The host 102 includes a processor 120 which generally may execute the operations of the host. A storage device 122, a display 124 and firmware 126 may be coupled to the processor 120. The storage device 122 may take any suitable form and, in particular, may take the form of a hard disk drive, a flash drive, an optical drive, and so forth. The display 124 may also take any suitable form and may be configured to provide graphical output for a user to view. The firmware 126 may take the form of a non-volatile read only memory (ROM), an electrically erasable programmable ROM, a flash memory, and the like. The firmware 126 may include a basic input-output system (BIOS) or an extensible firmware interface (EFI) that is tasked with initializing and identifying system devices such as the keyboard, for example.

The keyboard 104 may include a microcontroller 130 and, in some embodiments, a memory device 132 coupled to the controller. The microcontroller 130 includes some memory space that may store the calibration parameters. For the purposes of the present discussion, "calibration parameters" includes the descriptor and/or any other information that may be used to self-identify and/or calibrate the keyboard for use with a host device. In some embodiments, the memory 132 may be provided to store the calibration parameters. As such, either the microcontroller 130 or the memory device 132 may store the descriptor and the microcontroller may be configured to provide the descriptor to the host 102. Generally, the descriptor may be provided when the keyboard is discovered by the host. This may occur when the keyboard is initially coupled to the host system or, for example, when the host system discovers the keyboard on a peripheral interconnect, such as USB, FireWire, or the like, upon booting the host system. In other embodiments, the descriptor may be pushed from the keyboard. In still other embodiments, the information of the descriptor may be provided separately and upon request from a host. For example, the host may initially request the device layout, and then request the device language and input mappings. The keyboard 104 may provide the layout information prior to providing the language and mappings. It should be appreciated that regardless of the particular manner by which the information is provided, the calibration parameters are stored at the keyboard and provided to the host when the two are communicatively coupled.

The descriptor may take various different forms. In each case, the language, layout and mapping of the keyboard may be provided by the descriptor. An example descriptor is provided in Table 1 below. The first column of the table indicates an "offset" or "offset slot" within the descriptor and which contains defined data. An "offset" or "offset slot" as used herein may refer to a location within the descriptor or data packet that is transferred from a peripheral device to a host to self identify the peripheral device. Generally, each offset may take the form of a byte of data for the descriptor, although it should be appreciated that the offsets may take any form and, in some embodiments, may not be equally sized. In one embodiment, the descriptor is a binary string of bytes. Each offset or offset slot is defined to contain particular data or information have particular significance. The second column or middle column sets forth the definition for the offsets. That is, the middle column in Table 1 describes what the data contained in the offset means. The third column includes comments or values relating to the contents of the offset slots.

TABLE 1

| Offset | Definitions | Comments/Values |
|--------|-------------|-----------------|
| 0 | Report Versions | 0x1 |
| 1 | Keyboard Layouts | 1 = ANSI, 2 = ISO, 3 = JIS |
| 2 | Language | 1-35 languages |
| 3-6 | Arrow Key Mappings | Table of Mappings |
| 7-18 | F-key Mappings | Table of Mappings |

The descriptor shown in Table 1 provides 19 offset slots (0-18) that are populated to indicate the functionality, layout, language and mapping of the keyboard 102. Each offset slot within the descriptor is defined as providing specific information about the keyboard parameters. For example, offset slot 0 defines the version of the descriptor. In Table 1, it is shown as version "0x1". Offset slot 1 defines the keyboard layouts. Various different layouts may be represented numerically. For example, a "1" in offset slot 1 may correlate to an ANSI layout, a "2" may correlate to an ISO layout, and a "3" may correlate to a JIS layout. Offset slot 2 defines the language of the keyboard. As with the keyboard layouts, the languages may be represented numerically. For example, there may be 35 different languages supported by a keyboard with "1" correlating with English, "2" correlating with Spanish, "3" correlating with French, and so forth up to 35. Offset slots 3-6 define the arrow key mappings, and offset slots 7-18 define the F-key mappings, but can be any alternative key mappings. In one example, slots mapped to F1-F12 may be pre-numerated and each slot may correlate to a particular key. For example, offset slot 13 may correlate to the F6 key. The table of mappings for the F-keys may indicate the functionality of the F-keys. For example, the table may indicate that the F6 key is mapped to control display brightness.

It should be appreciated that Table 1 is provided merely as an example format of the descriptor for a keyboard. Other embodiments may include more or fewer offset slots and the slots may have different definitions. In some embodiments, the descriptor may include slots for special keys so that their functionality may be defined. Further, in other embodiments, the descriptor may include strings that describe the functionality, layout, language and mapping of the keyboard. In these embodiments, however, the descriptor may increase in size. The size of the descriptor is arbitrary and can be larger to accommodate more key mappings or smaller to accommodate fewer key mappings. Further, it may identify the device type. A descriptor having a different construction may be provided for other peripherals devices. For example, the descriptor may have a different number of offset slots for a mouse, trackpad, or a touchpad. The descriptor may indicate and define functionality such as multitouch as well as alternative functions for certain inputs. In one embodiment, the corner of a touchpad may be defined to provide alternative inputs.

Allowing the peripheral devices, such as the keyboard 102, to report their layout, language, and mappings, among other possibilities, helps to simplify both the manufacture and distribution of the keyboards and hosts with which they will communicate. Additionally, it may simplify the user experience, as the user will not have to select a particular language or layout for the device prior to it operating properly with the host.

Figure 3:
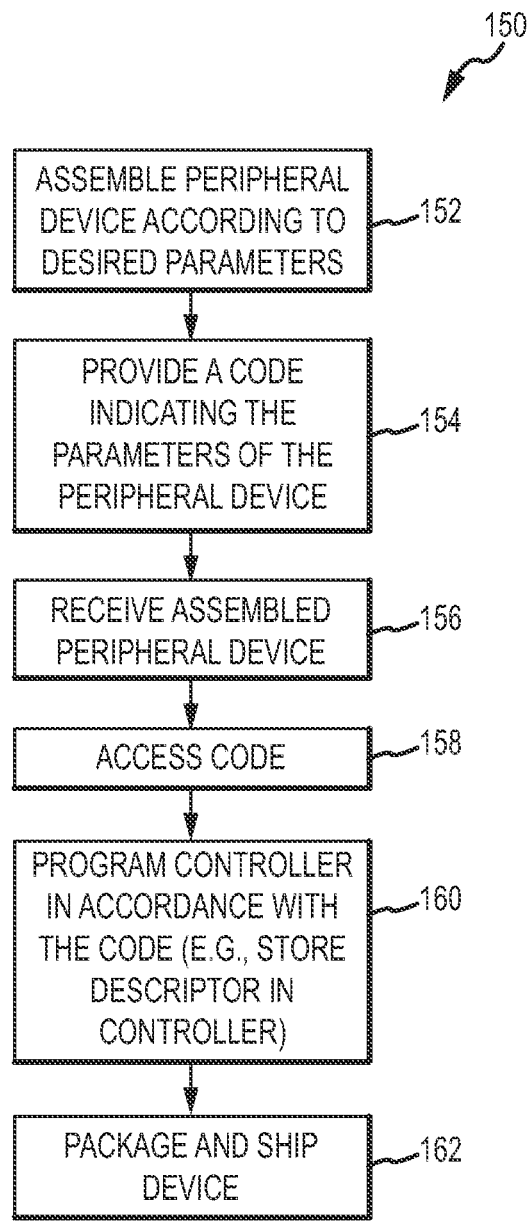
FIG. 3 is a flowchart illustrating a method of manufacturing a peripheral device to report a descriptor.

With respect to the manufacture of the keyboard, the keyboard may simply be programmed with the descriptor so that it may self-identify. FIG. 3 is a flowchart illustrating a method of manufacture 150 of a peripheral device in accordance with an embodiment. Initially, the device may be assembled in accordance with desired parameters (Block 152). For example, a keyboard may be assembled having a set layout and particular keys. The keys may be silk screened with characters that correspond to the language and functionality of the keys. A code may be provided to identify the parameters of the device (Block 154). A barcode may be encoded with the code and integrated with a sticker which may be attached to the keyboard. Hence, the barcode sticker identifies the layout, language and mappings of the keys or indicates a version of a descriptor that may represent the parameters of the keyboard.

Once assembled, the device is received for programming (Block 156). A code reader, such as a barcode scanner, reads the code and the controller of the device is programmed in accordance with the information indicated by the code (Block 158). Prior to this programming, the firmware of the device does not know the parameters of the keyboard. The descriptor information saved into the microcontroller enables reporting the physical layout, the language and the mapping of the keys. In other embodiments, the descriptor information may be stored in memory such as flash memory 132, to which the microcontroller is coupled, so that the microcontroller has access to the information. The peripheral device may then be packaged and shipped (Block 160).

Once the peripheral device is received by a consumer and coupled to the host, the peripheral device may report its parameters. In particular, every time the device is enumerated, for example when the host starts, the host queries the parameters from the device. In other embodiments, the keyboard may feed the host without being queried. It should be appreciated that the descriptor may be provided to the host over any suitable transport layer, wired or wireless.

Figure 4:
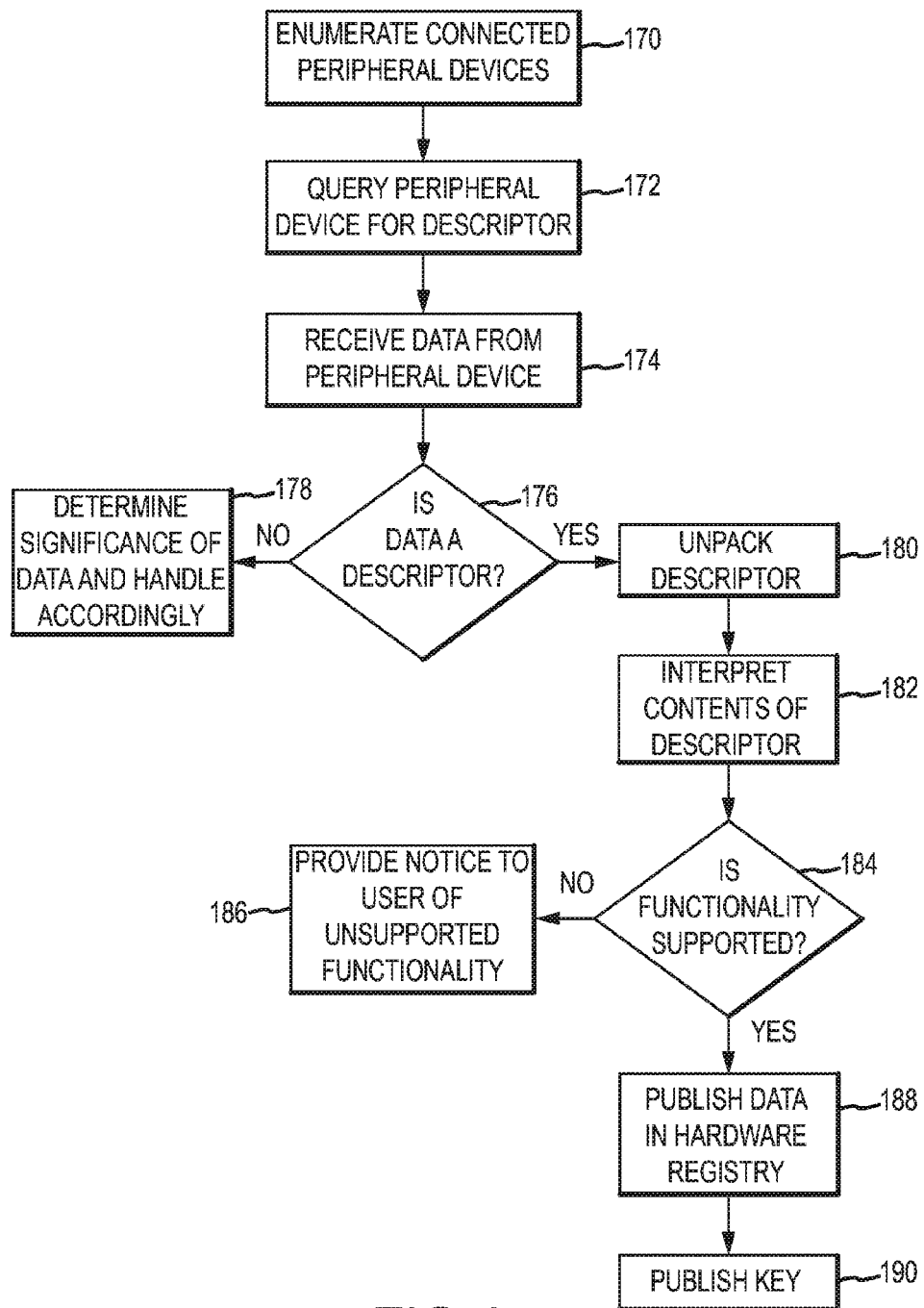
FIG. 4 is a flowchart illustrating a method of operating the host of FIG. 1 when receiving a descriptor from a peripheral device.

FIG. 4 is a flowchart illustrating a process that occurs at the host when the peripheral device provides the descriptor to the host. Initially, the host enumerates the peripheral devices that are coupled to it (Block 170). This may occur when the host is booted or when a new device is determined to be coupled to the host. The host firmware or operating system may perform the enumeration depending on if the device is coupled to the device during startup or after startup.

The host may query the device for the descriptor (Block 172) and receive data in return (Block 174). In some cases, a peripheral device connected to the host may not be configured to provide a descriptor. For example, the device may be a legacy peripheral device. As such, upon receiving data from the peripheral device the host determines if the peripheral device has provided a descriptor (Block 176). If the peripheral device has not provided a descriptor, the host 102 may determine the significance of the data and handle it accordingly (Block 178). For example, the received data may be a product id that corresponds to the layout and mappings for the device. The layout and mappings may be retrieved from a table and hard coded for use by the host.

Alternatively, if the host receives a descriptor, the host unpacks the descriptor (Block 180). The descriptor is generally small so that it may be transferred and unpacked relatively quickly. The contents of the descriptor are then interpreted (Block 182). In some embodiments, the interpreted data may be stored by the host. A determination may be made by the host as to whether all the functionality indicated by the data of the descriptor is supported (Block 184). This determination occurs during enumeration of the devices. If there is some functionality that is not supported, the host may provide an alert to the user indicating that the functionality is not supported (Block 186). The OS performs the determination as to whether certain functionality is supported and the determination may be based upon limitations of particular host system. In some embodiments, the host may provide an indication to the user if certain functionality is supported.

For the functionality that is supported, the data is published in a registry (e.g., a hardware or IO registry) (Block 188). The registry may generally be described as a dictionary that contains the hardware capabilities and the states of the hardware associated with the host. Objects represented in the registry may correspond to particular devices. On the object that represents the keyboard a may be published that describes the keyboard layout, the language and the mapping, among other things. The published strings provide the key mappings of the device to other software entities (e.g., applications, programs, and so forth) on the host. That is, the strings contain information used to identify inputs to the host and the strings are accessible or otherwise made available to the host software. A key is also published so that the host system may know how to interpret the input from the device (Block 190). Once published, the information is available for querying by other entities. Further, the data is available to the HID system, for querying and translation of the input. As such, other software layers do not need to know how the information is acquired.

Returning again to the keyboard example, when a key is struck, the keyboard may provide the keystroke to the host. The keystroke may be interpreted based on the string that is published in the registry that indicates the language and mapping of the key. As such, the keystroke may be reported by the keyboard and subsequently remapped based on the string that is stored in the registry. Generally, a layer of the operating system (OS) performs translations. Accordingly, the string is published so that the OS can make the translations. In contrast to prior techniques, no user input is requested by the host in order to determine the language of the keyboard.

The mapping of the inputs can be situationally or contextually based. That is, an OS or application may provide different mappings for keystroke inputs depending on a particular context currently operating on the host. The different mappings may be provided through tables that are associated with the OS or the applications. For example, a particular application may be configured to utilize alternative mappings of the keys. As such, when the application is running, received keystrokes may be mapped to their alternative functions in accordance with a mapping provided by the application. In one embodiment, a remapping of keys to alternate functionality occurs at a certain level in the software based on the device descriptor. An application may be configured to dynamically (on a context-sensitive basis) pass a descriptor or configuration of its own to that layer and a decision may be made as to whether the descriptor or configuration of the application is supported and whether to remap based on the configuration (or not). Alternatively, logic may be pushed up a software stack. For example, when passing a keystroke event to an application, in the event that the keystroke is a remapped keystroke, it may be noted that the keystroke was a remapped keystroke, so that the higher levels may treat it accordingly (e.g., interpret it correctly according to the remapped functionality). Additionally, the original non-remapped function of the key may be passed to the application as well. The application may then choose to interpret the keystroke as it sees fit (e.g., according to a context).

Figure 5:
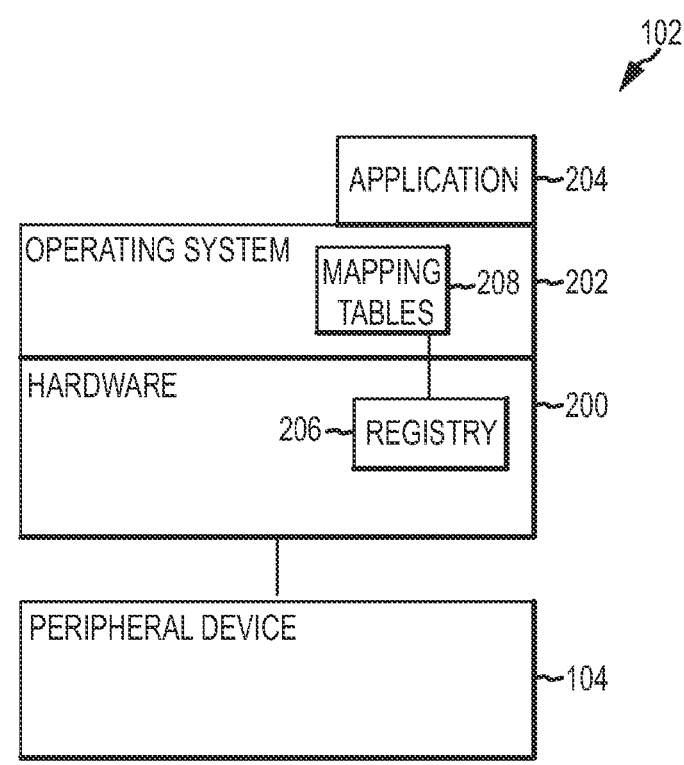
FIG. 5 illustrates layers of a host system and the peripheral device.

FIG. 5 illustrates the host device 102 coupled to the keyboard 104 and various layers of the host device 102. In particular, a hardware layer 200, an operating system layer 202 and an application layer 204 are illustrated. The hardware layer 200 is illustrated as including the registry 206. As may be appreciated, the hardware layer 200 may include the storage, CPU and firmware shown in FIG. 2, among other things. The operating system layer 202 includes a mapping table 208 that has access to the registry 206. The mapping table 208 is established based on information provided from the keyboard 104 in the descriptor. That is, the mapping table 208 utilizes the language and mapping information provided from the keyboard 104 to establish the mapping table 208. The mapping table 208 is used by the operating system 202 to translate received inputs. That is, when an input is received from the peripheral device (e.g., a key is pressed on the keyboard 104), the operating system 202 knows what key is pressed and then translates the keystroke based mapping table 208. As mentioned above, the mapping table 208 may provide for contextual mapping based on a particular operating context. For example, the operating system may translate a particular keystroke in different ways depending on what application is currently running. Also, if a particular key's functionality is not supported, the operating system may ignore the keystroke or may notify a user via an audible or visual alert (e.g., a notice may be provided on a display screen that the key's functionality is not supported). The string published by the registry may not contain any information with respect to unsupported functionality and, as such, the mapping table 208 will similarly not contain information supporting that functionality.

The use of the descriptor reporting the functionality, layout, language and mapping of the peripheral devices simplifies the manufacturing process, the connection and operation process, as well as the updating process for the peripheral devices and their hosts. The logic storage is concentrated. That is, the peripheral devices themselves store the logic rather than the host devices. Additionally, the production and release cycle may be shortened, as the programming of the peripheral devices occurs once during manufacture and allows the device to fully self-identify without updating f tables in host devices. Additionally, customer support issues are eliminated as all the information for proper operation of the device is stored with the peripheral device. Further, the ability of host to know the right language without having to receive user input simplifies the customer experience.

In some embodiments, the parameters may be pushed to a host from a network device. That is, the information of a descriptor may be received through the Internet, a local area network, a wide area network, and the like. The information obtained from the network device may update tables stored on the host. Additionally, the host can transmit the information to the peripheral device in the form of a descriptor or another suitable form via the interconnect (e.g., USB) to replace the information stored on the microcontroller or memory of the peripheral device. Thus, the peripheral device may be configured to receive a descriptor from the host. This allows the peripheral device's functionality to be updated. The received descriptor may update layout, language and key mappings for the peripheral device, for example. Thus, a particular key may be overloaded to provide additional functionality and/or the functions of certain keys may be changed without replacing the peripheral device itself.

The foregoing describes some example embodiments for communicating peripheral device functionality to a host. Although the foregoing discussion has presented specific embodiments, persons skilled in the art will recognize that changes may be made in form and detail without departing from the spirit and scope of the embodiments. For example, in some embodiments, a peripheral device may be configured to report a descriptor and a product ID to a host. This allows the peripheral device to interoperate with host systems that may not implement a descriptor mechanism. Accordingly, the specific embodiments described herein should be understood as examples and not limiting the scope thereof.

The invention claimed is:

1. A method of operating a host computing device, the method comprising:
communicatively coupling with a keyboard;
receiving a descriptor from the keyboard, wherein the descriptor includes data representative of a language, a layout, and key mappings that describe one or more alternate functionalities of the keys, the descriptor enabling the keyboard to self-identify to the host computing device;
in response to receiving the descriptor, automatically publishing in a memory on the host computing device a string accessible to the host computing device indicating the language, layout and key mappings of the keyboard and automatically determining the one or more alternate functionalities of the keys;
determining whether the one or more alternate functionalities is supported by the host computing device; and
in response to receiving input from the keyboard in accordance with the data from the descriptor, performing the one or more alternate functionalities upon receiving a keystroke indicating the one or more alternate functionalities, if the one or more alternate functionalities is supported by the host computing device.

2. The method of claim 1 further comprising providing a notice to a user of the host computing device if the one or more alternate functionalities is not supported.

3. The method of claim 1 further comprising providing a notice to the user of the host computing device if the one or more alternate functionalities is supported.

4. The method of claim 1 wherein the host computing device determines the keyboard's language, layout and key mapping independent of user input.

5. The method of claim 1 wherein the host computing device decides if the one or more alternate functionalities will be supported by the host computing device independent of user input.

6. The method of claim 1 wherein the determination whether the one or more alternate functionalities is supported by the host computing device is based, at least in part, on an operating system that is installed on the host computing device.

7. A computing system comprising:
a keyboard comprising:
a memory device storing a language of the keyboard, a layout for the keyboard and a keyboard mapping that includes information about one or more functions of one or more keys of the keyboard; and
a host device in communication with the keyboard and configured to receive the language, layout, and keyboard mapping from the keyboard that self-identify the keyboard to the host device, the host device comprising:
a memory device configured to receive and store the language, layout and keyboard mapping of the keyboard; and
a processor configured to execute operations in response to input received from the keyboard in accordance with the language, layout and keyboard mapping stored in the memory device;
wherein the processor is configured to determine if the one or more functions of the one or more keys are to be executed when the host device receives input from the keyboard indicating a selection of the one or more functions.

8. The computing system of claim 7, wherein the keyboard comprises one of an ANSI, a JIS, or an ISO layout.

9. The computing system of claim 7, wherein the keyboard is configured for one of English, Spanish, French, Portuguese, or German.

10. The computing system of claim 7, wherein the one or more keys comprises an F-key.

11. The computing system of claim 7, wherein the processor is configured to determine if the one or more functions of the one or more keys are to be executed based at least in part upon an operating system of the host device.

12. The computing system of claim 7, wherein the keyboard is configured to provide at least one product identifier to the host device.

13. The computing system of claim 7, wherein the keyboard provides the language, layout and keyboard mapping to the host device only after receiving a query from the host device requesting a descriptor.

14. The computing system of claim 7, wherein the language, layout and keyboard mapping are provided to the host device as a descriptor.

15. The computing system of claim 7, wherein the language, layout and keyboard mapping are provided to the host device separately and sequentially upon request.

16. A method of interoperation in a system comprising a host and a peripheral, the method comprising:
initiating communication between the host and the peripheral;
receiving a descriptor at the host, wherein the descriptor comprises data indicating at least one of a language, a layout and a mapping of the peripheral that allow the peripheral to self-identify to the host, wherein the mapping of the peripheral indicates specific functionality of at least one input device of the peripheral;
in response to receiving the descriptor, automatically determining if an input device is assigned alternate behaviors based on the data received in the descriptor;
deciding if the alternate behaviors are to be executed by the host if the input device is assigned alternate behaviors;
executing the alternate behaviors upon receiving input from the peripheral indicating alternate behavior if the host decided to execute the alternate behaviors; and
ignoring input from the peripheral indicating alternate behavior if the host decided not to execute the alternate behaviors.

17. The method of claim 16, wherein the host is configured to provide an indication that the alternate behaviors will not be executed if the host decided not to execute the alternate behaviors.

18. The method of claim 16, wherein the host stores the data from the descriptor in memory as long as the host and the keyboard maintain communication.

19. The method of claim 16, wherein the host receives a product identifier from the keyboard in addition to the descriptor.

20. The method of claim 1, further comprising sending a second descriptor to the keyboard that updates the descriptor for the keyboard.

21. A method of operating a host computing device, the method comprising:
- communicatively coupling with a keyboard;
- querying the keyboard for a descriptor;
- receiving the descriptor from the keyboard communicatively coupled to the host computing device, wherein the descriptor includes data representative of a language, layout, and key mappings for the keyboard that allow the keyboard to self-identify to the host computing device;
- in response to receiving the descriptor, automatically determining whether each functionality indicated in the descriptor is supported by the host computing device;
- for each functionality indicated in the descriptor that is supported by the host computing device, publishing a string indicating the supported functionality in a memory on the host computing device; and
- if a given functionality is not supported by the host computing device, providing notice to a user of unsupported functionality.

22. The method as in claim 21, further comprising sending a second descriptor to the keyboard that updates the descriptor for the keyboard.

23. The method as in claim 22, further comprising prior to sending a second descriptor to the keyboard, receiving the second descriptor from an application operating on the host computing device.

24. The method as in claim 22, further comprising prior to sending a second descriptor to the keyboard, receiving the second descriptor from a network device.

25. A method of interoperation in a system comprising a host and a peripheral, the method comprising:
- initiating communication between the host and the peripheral;
- receiving data from the peripheral at the host;
- determining if the data comprises a descriptor, wherein the descriptor includes data representative of at least one of a language, a layout and a mapping that describes one or more alternate functionalities of an input mechanism of the peripheral, the descriptor enabling the peripheral to self-identify to the host;
- if the data comprises the descriptor, determining functionality of the peripheral supported by the host;
- if the data does not comprise the descriptor,
  - determining if the data can be used to determine at least one of a language, a layout and a mapping of the peripheral that allow the peripheral to self-identify to the host; and
  - if the data can be used to determine at least one of a language, a layout and a mapping of the peripheral, determining functionality of the peripheral supported by the host.

* * * * *